Sept. 16, 1941.          L. LEITZ ET AL          2,256,207
              ROLL FILM CAMERA WITH SPRING MOTOR
                  Filed April 19, 1939          2 Sheets-Sheet 1

INVENTOR
Ludwig Leitz, Heinrich Broschke
BY
ATTORNEY

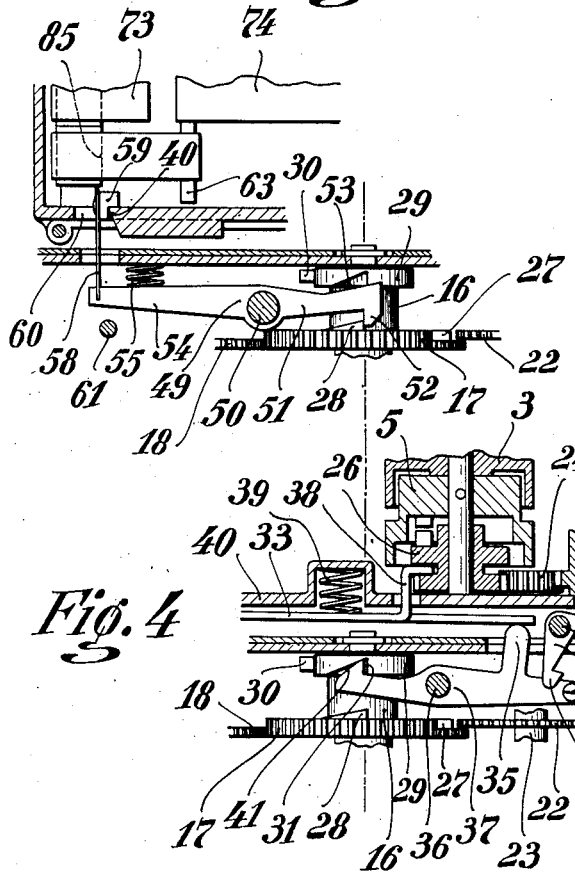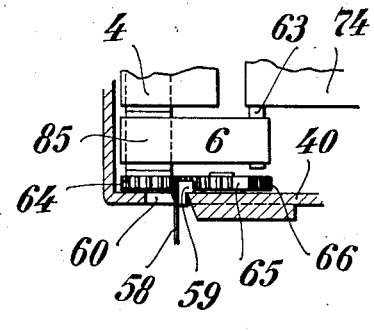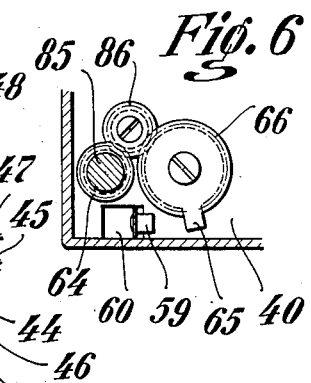

Patented Sept. 16, 1941

2,256,207

UNITED STATES PATENT OFFICE 2,256,207

ROLL FILM CAMERA WITH SPRING MOTOR

Ludwig Leitz and Heinrich Broschke, Wetzlar, Germany, assignors, by mesne assignments, to Frank Dumur, Lausanne, Switzerland Application April 19, 1939, Serial No. 268,710
In Germany May 12, 1938

2 Claims. (Cl. 95—31)

This invention relates to roll film cameras with focal plane shutters which include as a part of the camera mechanism a self-starting spring motor for actuating the film advancing mechanism and for actuating the shutter rewinding mechanism for either single exposures or series of exposures. The spring motor may be built-in or it may be detachable as an accessory to the camera. Cameras including spring motors for the purposes mentioned are known but they suffer from the disadvantage that the running-off speed of the spring motor cannot be synchronized with the shutter speeds; or that for this purpose a special arrangement is required which so limits the relation or ratio of the motor speed to the shutter speed that a series of pictures can be taken only with very short exposures. If longer exposures are demanded or desirable, then the motor, because of its even regular speed, starts to advance the film before the exposure is finished. To overcome this trouble it has been proposed to regulate or influence the operation of the motor speed governor in such a manner that it would also control the number of revolutions of the spring motor. This however can be done only within very narrow limits.

The object of this invention is to provide a generally improved spring motor mechanism to be used with a roll film camera having a focal plane curtain shutter, said mechanism embodying as a particularly novel feature a construction in which the movement of the follow-up curtain is utilized to release the spring motor in a manner or by mechanism which does not require or include that the force of the curtain movement shall also overcome the tension of the motor springs. That is to say, the movement of the follow-up curtain is utilized only for the release of the spring motor and in effecting this release the curtain is not employed to overcome the tension or resistance of the springs in the motor.

The invention is embodied in a spring motor and camera mechanism in which the follow-up curtain of the shutter at the end of its shutter closing movement actuates a mechanical relay which then in turn by means of a spring releases the motor. The spring motor itself after having been released causes the relay to be brought back into its original ready position so that the operating cycle may be continued for each exposure. This construction insures that the spring motor be not started until after an exposure has been finished.

Some attempts have been made to have the follow-up curtain release the spring motor. Such attempts included a construction in which the curtain by striking against a stop pawl released a gear on the film winding up roller and thus released the spring motor. Such an arrangement was not practical and could not be used because the entire force of the motor spring acts upon such gear and stop pawl and the curtain spring, which at the end of the curtain closing movement is almost entirely without tension, was not strong enough to overcome the force of the motor spring acting upon the stop pawl.

The invention is embodied in a camera and motor mechanism arranged and constructed as hereinafter set forth and as illustrated in the accompanying drawings in which Fig. 1 is a sectional view of the camera and spring motor taken substantially on the line 1—1 of Fig. 2 with parts removed or broken away and sectioned.

Figs. 3 and 4 show some mechanisms in Fig. 1 in different positions. Parts are sectioned and broken away.

Figs. 5 and 6 illustrate a modification.

Figure 1:
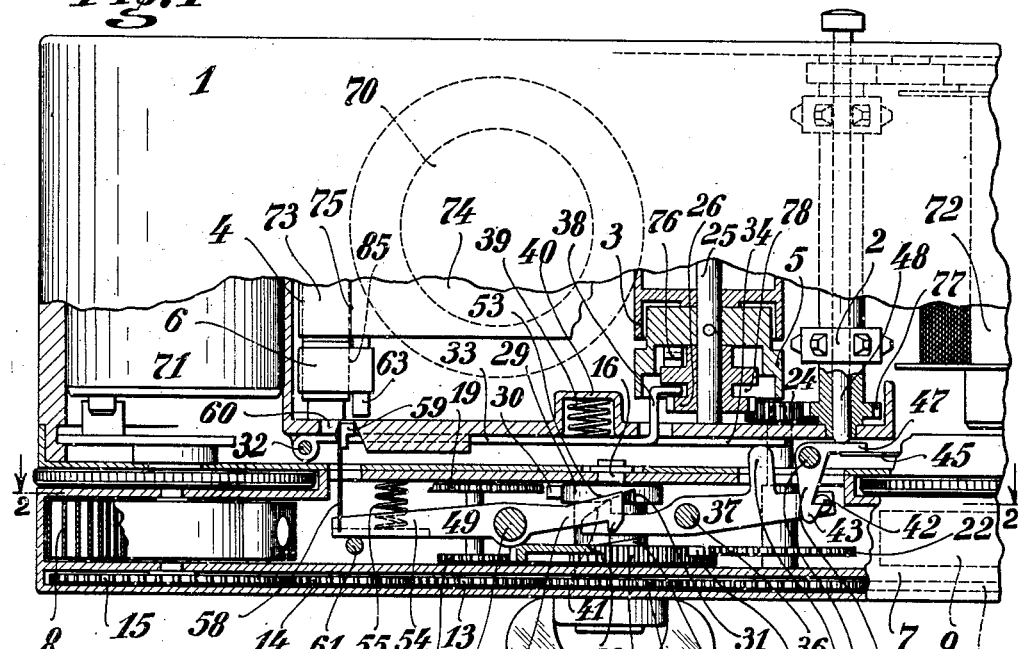
Figure 2:
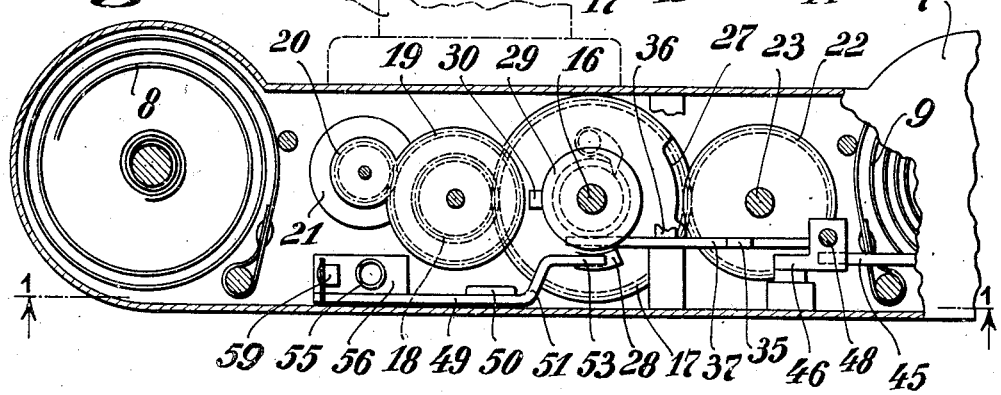
Fig. 2 is a sectional view on the line 2—2 of Fig. 1 with parts removed and broken away.

Referring first to Figs. 1 to 4 the camera 1 is of a type and construction well known in the art. For the purposes of this invention it will be sufficient to identify the camera mechanism by the objective 70, the film spools 71 and 72 and the depressible shutter release 40 which passes downward through the film transport roller 2. The camera is provided with a focal plane shutter of the type shown in U. S. Patent 2,122,671, July 5, 1938. The shutter consists of two shutter curtains. The one edge of the leading curtain 73 is secured to and wound up upon a curtain spring roller 4. The other edge of said curtain is as usual connected by ribbons to winding up drums 5 on the curtain roller shaft 25. The leading curtain is broken away as shown and its connection to the drums 5 are not shown, being well known. The follow-up or second curtain 74 is at its one edge connected to and it is wound up upon the curtain roller 3 on the said shaft 25. The other edge of the second curtain 74 is connected by ribbons 6 to another winding up spring roller which lies directly behind the roller 4 and therefore is not visible in the drawing, said ribbons 6 passing around an idler roller 85 on the shaft of the winding up roller 4. In making an exposure the curtains pass from the right to the left in the drawings. The curtain roller 3 is by means of a well known coupling 76 operatively connected to a gear 26 which meshes with a pinion 24. The latter in turn drives a gear 77 on the film transport roller 2. The pinion 24 is fast on a shaft 23 which is driven by the spring motor. When the latter is released the shaft 23 and pinion 24 are rotated so that on the one hand the curtain roller and drums may be rotated to wind up the shutter curtains and the springs, not shown, in the curtain rollers, and on the other hand the film transport roller may be rotated to wind up and advance the film. The construction and operation of this type of focal plane shutter is well known and understood in the art.

The spring motor 7 may be built-in or it may be detachably connected to the camera. The springs 8 and 9 are shown as being coaxial with the film spools 71 and 72. The two springs are operatively connected by a number of gears marked 10, 11, 12, 13, 14 and 15. The gear 12, upon which both springs act at the same time, is fast on the motor drive shaft 16. The latter also carries a gear 17 which by means of gears 18, 19 and 20 is operatively connected to a governor disk 21. To the other side the gear 17 meshes with a gear 22 fast on the aforesaid shaft 23. The gear 17 is provided with a blank portion 27 and carries also an upstanding tooth 28. The drive shaft 16 carries a disk 29 which is provided with a radially disposed nose 30. The disk also is recessed as at 31.

To the bottom 40 of the shutter casing there is secured a pivot pin 32 which carries a lever 33 the free end 34 of which rests upon the upright arm 35 which is part of a lever 37 pivoted at 36. The right hand end of this lever 37 carries a pin 42. The left hand end of the lever 37 is formed with a hook 41 adapted to engage in the said recess 31 in the disk 29, see Fig. 4. The lever 33 has also an upstanding hook 38 which engages an annular groove 78 in the said gear 26 on the curtain roller shaft 25. A spring 39 urges the lever 33 downward.

The pin 42 in the lever 37 is adapted to be engaged by a hook 43 on a bell crank 46 which is pivoted at 44. A spring 45 keeps the bell crank in engagement with the pin 42, Fig. 1, and also keeps the arm 47 of the bell crank up against the lower end of the depressible shutter release 48. Another two armed lever 49 is pivoted at 50. The right hand end of this lever is upwardly inclined as at 53 and forms a hook 52 adapted to engage the tooth 28 on the gear 27, Fig. 3. The inclined cam surface 53 is adapted to be engaged by the nose 30 on the disk 29.

The left hand arm 54 of the lever 49 is pressed downward by a spring 55 against a stop 61. The spring acts against a foot 56 which is part of the lever arm 54. Secured to the arm 54 is a leaf spring 58 which extends upwards from the arm at about a right angle. The upper end of the leaf spring 58 carries a hook 59 which is adapted to move in a cut out 60 in the camera wall as shown. The hook 59 is adapted to be knocked out of its rest position on the edge of the opening 60, Fig. 3, by a pin 63 on the second curtain.

At this time the positions of the several parts of the mechanisms should be noted as they are shown in the drawings. Fig. 1 shows the parts in the positions which they assume immediately after the motor has been released and the shutter is being rewound and the film advanced. It will be noted that the disk 29 has been rotated by the motor sufficiently to move the hook 41 out of the disk recess 31 hence the lever 37 has been tipped anticlockwise to lift the long thin lever 33 with its upstanding hook 38 whereby to couple the gear member 26 with the curtain roller shaft 25. The curtain roller has now started to rewind the shutter, the edges of the curtains being closed as at 75. On the other hand, the arm 54 of the lever 49 has been depressed by the spring 55 so that the hook 52 of said lever lies above the tooth 28 on the gear 17. The latter therefore is rotating, the motor being released.

Fig. 3 shows the positions at or near the end of an exposure, the exposure opening being between the curtains 73 and 74 as shown. Here it will be seen that the motor is not released because rotation of the gear 17 is prevented by the engagement of the hook 52 with the tooth 28. Fig. 4 shows that the shutter release has just been operated to tip the bell crank 46 to permit the lever 33 to be moved down by the spring 39 whereby to uncouple the gear member 26 from the curtain roller which is now free to rotate so that the shutter may be opened.

The operation is as follows: Let it be supposed that the motor springs 8 and 9 have been tensioned by rotating the handle 62 at the bottom of the motor casing and the camera is ready to be operated. At this time the shutter is closed because the shutter release has not been depressed, hence the bell crank 46 is locked, the long thin lever 33 is in its upper position against the wall 40 and the gear member 26 is coupled to the curtain roller shaft 25 which therefore cannot rotate. This situation is pictured to the right in Fig. 1. At the same time the motor is prevented from rotation because the hook 52 lies in front of the tooth 28 as shown in Fig. 3.

When an exposure is to be made the photographer presses down upon the shutter release 48 and thereby tips the bell crank 46 clockwise, Fig. 4. The release is a short quick movement whereby the two armed lever 37 is quickly released (see Fig. 4) and said lever is now tipped clockwise about its pivot 36 by a downward movement of the long thin lever 33 under pressure by the spring 39 and the hook 41 of said lever 37 snaps up into the recess 31 in the disk 29. As soon as the lever 33 moves down, its upstanding hook 38 pulls down the coupling gear member 26 and uncouples the same from the curtain roller. The latter is now free to rotate and the shutter is opened to make the exposure.

At the end of the exposure the pin 63 on the second curtain 74 runs against the hook 59 on the leaf spring 58 and knocks it off the edge of the opening 60. As soon as this happens the spring 55 depresses the arm 54 of the lever 49, see Fig. 1, and lifts the hook 52 above the tooth 28, the motor is now free to run off and the gear 17 commences to rotate, anti-clockwise in Fig. 2. As soon as the disk 29 starts to rotate with the gear 17 and drive shaft 16 the recess 31 in said disk causes the hook 41 to be depressed, hence the lever 37 is tipped upwardly anti-clockwise on the pivot 36 whereby the upstanding arm 35 of said lever 37 lifts the lever 33 against the pressure of the spring 39 to cause the upstanding hook 38 to lift the gear member 26 and couple the same to the curtain roller shaft 25, the shutter starts to rewind and the film transport roller 2 starts to rotate to advance the film. The pin 42 on the bell crank snaps in behind the same and is locked in that position by the spring 45. The release 48 is returned to its upper normal position.

After the disk 29 has been rotated still further by the motor, the radially disposed nose 30 on the disk engages the inclined cam surface 53 of the lever 49 and causes said lever to be tipped clockwise about its pivot 50 to bring the hook 52 down upon the gear 17 in the path of the tooth 28. When the latter reaches the hook 52 the motor stops. The tipping of the lever 49 causes the leaf spring to be raised and its hook 59 is again hooked in over the edge of the opening 60 so that the lever 49 remains in downward tipped motor locking position.

A complete rotation of the drive shaft 16 and the gear 17 is sufficient to accomplish the advancement of the film one picture length and the complete rewinding of the shutter. The blank portion 27 on the gear 17 serves to permit the lever 37 to cause the lifting of the gear member 26 to complete the coupling thereof with the curtain roller shaft before the gear 22 begins to be rotated by said gear 17. Were this blank portion 27 not provided, it might happen that the coupling 76 would not be completed in time, so that, although the film would be advanced by operation of the gear 22, shaft 23 and pinion 24, the shutter might not be rewound or only partly rewound.

Figs. 5 and 6 illustrate a modification in which the pin 63 is removed from the second curtain and the hook 59 on the leaf spring 58 is knocked off the edge of the opening 60 by a tooth 65 which is carried by a gear 66 as seen in Fig. 6. The gear 66 is driven from the roller 85 on the shaft of the winding up roller 4 by means of gears 64 and 86. When the shutter is opened the ribbons 6 of the second curtain are drawn around and rotate the roller 85 before being wound up upon the second spring curtain roller which is not shown in the drawing. The number of teeth and proportions of the gears 64, 66 and 86 are such that at the end of the shutter opening movement the tooth 65 strikes the hook 59 and knocks it into the opening 60 with the results as above described. The arrangement in Figs. 5 and 6 possesses the advantage that the second curtain itself is not burdened with any motor releasing member such as the pin 63. On the other hand there is the advantage that the gears 64, 66 and 86 act in the nature of an escapement which results in an even movement of the second curtain.

The two armed lever 37 may be considered as a mechanical relay for releasing the shutter and whereby particular advantages are obtained not only in a motor driven camera but for cameras generally. Shutter releases as usually constructed and operated are one of the main causes for the tearing or irregular movements of the film because of the mechanical resistances to be overcome by the release. Such a disadvantage or objectionable feature is completely eliminated by using a relay as herein disclosed because the operation of the shutter release 48 only serves to release the relay whereas the real shutter release is accomplished by the spring 39. Again, in a shutter release according to the invention the resistance against the operation of the release 48 is always the same and the parts may be constructed accordingly. Such resistance is much less than that which is to be overcome in ordinary releasing mechanisms. Another advantage is that the mechanical relay may be accurately calculated and constructed with freedom from vibration and exact proportions as circumstances may require. The same or similar advantages are obtained by using a relay such as the lever 49 for releasing the motor.

It will be noted that the only resistance against operation of the release 48 is caused by the flat spring 45 and all other work to be performed in operating the shutter release is caused by the spring 40 and the motor which drives the disk 29. Likewise the resistance against the pin 63 on the second curtain or against the tooth 65 to release the second relay 49 is caused only by the leaf spring 58 which keeps the hook 59 in position on the edge of the opening 60. Thus more or less violence or power otherwise required to release the shutter and the motor are eliminated. A more smooth and evenly balanced operation is obtained.

We claim:

1. In a motor driven camera, a focal plane shutter including a leading and a following shutter curtain, rewinding means therefor, a self starting spring motor for driving said rewinding means, a lever relay device engaging said motor for holding the same normally inactive, a hook connected to said relay and normally held thereby in the path of movement of said following shutter curtain to latch the relay in holding position, a shutter release for opening the shutter to make an exposure, means carried on said following shutter curtain engaging said hook at the end of its movement to release the same from its said normally held position and a spring urging said relay away from the holding position and operable upon the release of said hook for actuating said relay to release the motor to drive said rewinding means.

2. In a motor driven camera, a focal plane shutter including a leading and a following shutter curtain, opening means and rewinding means for said shutter, a self starting spring motor for driving said rewinding means, a first relay for normally operatively connecting the shutter and its rewinding means and to hold the shutter in closed position, a shutter release for actuating said first relay to disengage the shutter from its rewinding means and open the shutter, a second relay having a normal position for engaging said motor to hold the same inactive, means on said following shutter curtain to actuate said second relay to release the motor to operate said first relay to operatively connect the shutter with its rewinding means and to drive the latter to rewind the shutter after an exposure and means on the motor for moving said second relay back to its said normal position after the shutter has been rewound.

LUDWIG LEITZ.
HEINRICH BROSCHKE.